Aug. 20, 1963 R. C. LOOMIS ETAL 3,101,177
TUBULAR LIGHT GRID ASSEMBLY
Filed April 20, 1961
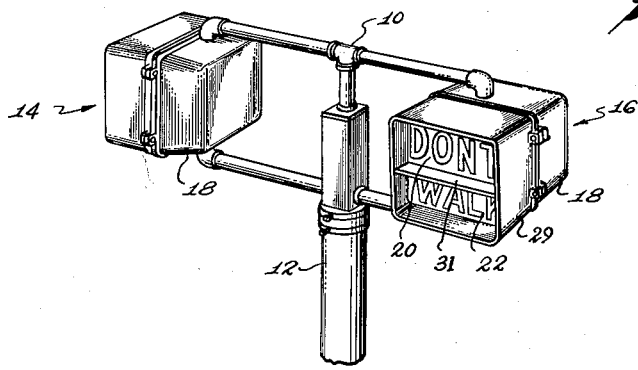
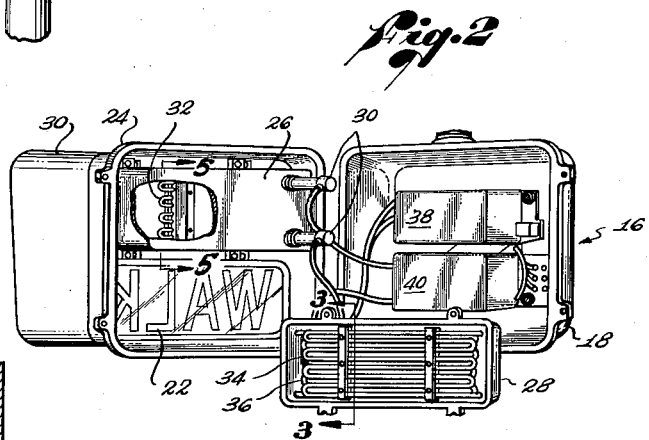
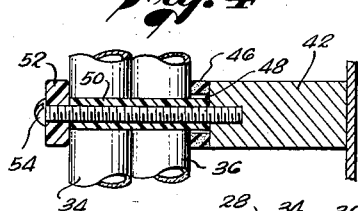
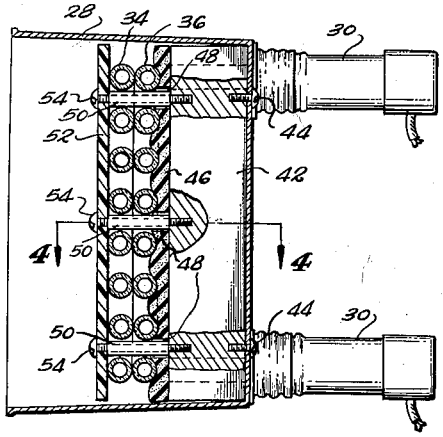
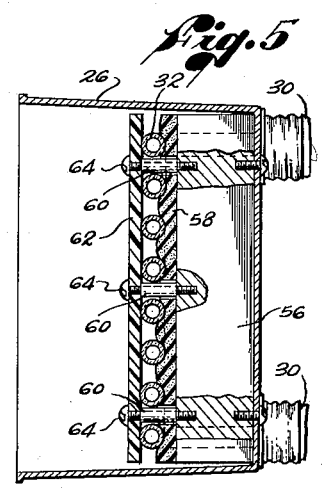
INVENTORS
ROBERT C. LOOMIS
WILLIAM R. DRUMM
BY
Fulwider Mattingly & Huntley
Attorneys United States Patent Office 3,101,177
Patented Aug. 20, 1963

3,101,177
TUBULAR LIGHT GRID ASSEMBLY
Robert C. Loomis, Anaheim, and William R. Drumm, Inglewood, Calif., assignors to Econolite Corporation, Los Angeles, Calif., a corporation of California
Filed Apr. 20, 1961, Ser. No. 104,423
3 Claims. (Cl. 240—11.4)

Our invention relates generally to grid type lighting systems, and more particularly, to a means and method for mounting tubular lighting grids in such a system.

While there are many different examples of grid type lighting systems, one well-known form is a grid type pedestrian signal. The grid type pedestrian signal is a signal having a housing which normally mounts two opaque glass plates having cut-out letters thereon to form words. The plates can be illuminated by respective luminous gaseous discharge tubings, each bent in the form of a grid and positioned individually behind a plate. When one or both of the grids are energized, one or both glass plates are illuminated to produce suitable and legible messages for control of pedestrian traffic.

The gaseous discharge tubings, or simply, gas tubings, are relatively long glass tubings, each bent into the form of a grid, and such grids are usually mounted individually behind respective word plates in order to properly illuminate the same, as required. The gas tubing grids, of course, have a limited life and burn out periodically, and must be replaced. Since a gas tubing grid is comparatively difficult to install in a signal, especially outside of a shop, the grid is usually premounted in a tubing housing which is adapted to be easily installed in the signal.

Grids pre-mounted in tubing housings adapted for easy installation in signals, however, have been broken or damaged so often in transit that it is not possible to ship such assemblies by ordinary methods. As a result, special shipment requiring extremely careful handling was necessitated. Sometimes, where shipment must be made over a great distance, it was necessary to ship the grid separately packaged from its housing in order to avoid damage thereto. This, of course, detracted much from the intended advantages of the added tubing housing which was provided to facilitate easy installation of the gas tubing grid in a signal.

It is an object of our invention to provide a gas tubing grid assembly which can be easily installed in a signal and which can be shipped by ordinary methods without damage or breakage of the gas tubing grid.

Another object of our invention is to provide a means and method for mounting a gas tubing grid in a housing whereby the grid can sustain varying shocks and also emit maximum, uniform light through an open face of the housing.

A further object of the invention is to provide a means and method for mounting, for example, two gas tubing grids in a housing so that the grids can withstand shocks encountered during transportation of the unit, and both grids can emit a maximum of uniform light, one at a time, without interference by the structure of the other.

Briefly, and in general terms, the foregoing and other objects are preferably accomplished by providing a reflector housing adapted to be easily installed in a signal, and means for mounting at least one gas tubing grid centrally in the housing. The gas tubing grid is supported at two places, for example, and each support comprises a support block secured to the bottom of the housing crosswise to the lines of tubing, a sponge rubber pad placed on top of the block to cushion the lines of tubing, a cleat bar for clamping the lines of tubing against the sponge rubber pad, and spacers of proper length for limiting the amount of tightening of grid tubing against the sponge rubber pad when the clamping cleat bar is fully tightened against the spacers. Such a construction thus provides a grid system centrally and firmly mounted in the reflector housing on at least two supports.

Our invention possesses other objects and features, some of which, together with the foregoing, will be set forth in the following detailed description of a preferred embodiment of the invention, and the invention will be more fully understood by reading the description with joint reference to the attached drawing, in which:

FIGURE 1 is a perspective illustrating a complete two-way grid type pedestrian signal which uses easily replaceable housings mounting gas tubing grids according to our invention;

FIGURE 2 is a perspective showing the internal arrangement of one element of such a signal;

FIGURE 3 is a cross-sectional view of a tubing housing mounting two grids therein and taken along the line 3—3 as indicated in FIGURE 2;

FIGURE 4 is a sectional view taken along the line 4—4 as indicated in FIGURE 3; and FIGURE 5 is a cross-sectional view of a tubing housing mounting one grid therein and taken along the line 5—5 as indicated in FIGURE 2.

A complete two-way grid type pedestrian signal is shown in FIGURE 1. Framework 10 is mounted on top of a post 12 and supports two one-way grid type signals 14 and 16. The signal 14 is mounted in the framework 10 to face a direction which is at right angles to the direction that the signal 16 is facing, as illustrated. The signal 14, of course, controls the pedestrian traffic in the crosswalk that it faces, and the signal 16 similarly controls the pedestrian traffic in the crosswalk that it faces.

Each pedestrian signal is housed in a weather resistant and dust tight housing 18, and is designed to display the alternating messages "Don't Walk" in red, or "Walk" in green. The messages are created by illuminating the opaque glass plates 20 and 22, having clear or transulcent areas therein shaped to form letters, with neon and fluorescent mercury gas tubings. Other types of tubings can be used to produce different colors of light, of course. The messages are made attention-attracting and clearly legible by either illuminating both of the glass plates 20 and 22 by the neon gas tubing to produce the message "Don't Walk" in red, or illuminating only the glass plate 22 by the fluorescent mercury gas tubing to produce the message "Walk" in green.

As shown in FIGURE 2, all components of each signal are readily and easily accessible from the front by opening the housing door. The signal 16 is shown with door 24 swung open on hinges on the left side of the door. The door 24 mounts the upper and lower glass plates 20 and 22 which are held in the housing door 24 by clips or other suitable securing means. Two tubing housings 26 and 28 each mounting gas tubing therein, are respectively attached to the housing door 24 by attaching screws, for example, with their open faces over the glass plates 20 and 22. The inside surfaces of the tubing housings 26 and 28 are preferably painted white for greater reflectivity. A visor 29 having the center thereof divided by a horizontal baffle 31 (FIGURE 1) is also secured to the housing door 24.

The tubing housings 26 and 28 are preferably one piece castings which mount luminous gas tubing bent in the form of a grid therein. Each grid consists of several parallel, equally spaced lines formed from a single and continuous clear or fluorescent glass tubing having the ends thereof bent out and terminated in standard capped electrodes 30 which are mounted on the tubing housing.

The tubing housing 26 has two capped electrodes 30 which are sealed in respective ends of the glass tubing formed into the grid 32. Tubing housing 28, however, has four capped electrodes 30 (not visible in FIGURE 2) located at the corners thereof, and each end pair of electrodes are respectively connected and sealed in the bent out ends of a glass tubing grid. There are two grids 34 and 36 mounted in the tubing housing 28. The electrodes 30 of the various grids are connected by suitable leads to high voltage transformers 38 and 40 which are provided for illuminating the gas tubings in a conventional manner.

The tubing housing 26 contains and mounts a clear glass tubing charged with neon gas and formed into the grid 32 which illuminates the "Don't" glass plate 20 when energized. Tubing housing 28 contains and mounts both a clear glass tubing charged with neon gas and formed into the grid 34, and a fluorescent glass tubing charged mainly with mercury vapor and formed into the grid 36. The grid 34 is energized to illuminate the "Walk" glass plate 22 simultaneously with energization of the grid 32. The neon gas tubings emit red light so that a red "Don't Walk" message is produced. The grid 36 is energized alone, after the grids 32 and 34 are turned off, and the fluorescent mercury glass tubing emits green light so that the glass plate 22 produces a green "Walk" message. These messages are, of course, alternately produced and conventionally controlled.

The grid 34 is mounted directly before the grid 36, as shown in FIGURES 2 and 3, because grid 34 is formed from clear gas tubing which can transmit light from the grid 36 without difficulty. The grid 36 is formed from fluorescent gas tubing which is coated on its inner surface with a phosphor and therefore cannot be positioned before the clear glass tubing because of its non-transmissibility. While the glass plate 22 could be illuminated by internal light reflections in the housing 28, even if the clear glass tubing grid 34 were located behind the fluorescent gas tubing grid 36, a large amount of shadows would be cast in such instance so that the message produced has poor legibility.

FIGURE 3 is a cross-sectional view of the tubing housing 28 and its mounted grids 34 and 36, as taken along the line 3—3 indicated in FIGURE 2. The view is enlarged to show clearly the mounting of the glass tubings in the housing 28. The tubings are securely supported laterally at two locations (as illustrated in FIGURE 2). At each support, a block 42, which is preferably fabricated from a machinable insulator, is secured to the back of the tubing housing 28 by screws 44. The width of the block 42 is nearly as wide as the inside back surface of the tubing housing 28. The height of the block 42 is chosen so that the tubings are raised or positioned approximately halfway to the front or open face of the housing 28, and the block thickness can be somewhat greater than the outer diameter of a tubing. The housing 28 is an effective reflector for focusing light from the centrally positioned lines of tubing of the grids 34 and 36 out the open face of the housing.

FIGURE 4 is a sectional view of the tubings and mounting thereof as taken along the line 4—4 indicated in FIGURE 3. The thickness of the block 42 can be seen to be slightly greater than the outer diameter of a tubing. The grid 36 is supported by a sponge rubber pad 46 which is, in turn, supported by the block 42. The pad 46 has a rectangular outline that matches the rectangular top or front surface of the block 42. From FIGURES 3 and 4, the grid 34 can be seen to be positioned directly before the grid 36 so that the horizontal lines of tubings (FIGURE 2) are closely aligned. The tubing of grid 34 directly contacts the tubing of grid 36 as shown, and permits the best transmission of light through the clear gas tubing of the grid 34. In addition, a maximum of support is provided firmly and solidly to the grid 34 through the grid 36.

The sponge rubber pad 46 has, for example, three over- sized holes 48 evenly spaced along its length to allow passage of the ends of the tubular spacers 50. The spacers 50 are preferably made of an insulator which has good, high voltage insulating properties, and the length of the spacers 50 is such as to permit cleat bar 52 to clamp all of the lines of tubing of the grid 36 firmly against the cushioning sponge rubber pad 46 by means of screws 54. The cleat bar 52 is transparent and preferably made of a stiff or rigid plastic. The sponge rubber pad 46, of course, must be sufficiently thick to provide a yieldable cushion after the grid 36 is firmly held against the pad.

The shanks of screws 54 pass through holes in the cleat bar 52 and through the hollow spacers 50 to thread into tapped holes in block 42. When the cleat bar 52 is tightened firmly against the spacers 50 by screws 54, the tubings are held firmly aligned and cushioned in the sponge rubber pad 46. This is, of course, duplicated at the other support (FIGURE 2) by similar mounting means.

The length of the spacers 50 are such as to provide a predetermined amount of tightening of grid tubing against the resilient sponge rubber cushioning, when the cleat bar 52 is fully tightened by its attaching screws. Thus, a constant pressure is normally maintained against the tubing but there is also the resilient yield due to the flexible sponge rubber pad available at all times to absorb shock and motion of the tubing.

FIGURE 5 is a cross-sectional view of the tubing housing 26 and its mounted grid 32 as taken along the line 5—5 indicated in FIGURE 2. The grid 32 is preferably supported at two places similar to that shown in the tubing housing 28. The housing 26 has a block 56, at the support shown in FIGURE 5, which is similar to the block 42 of FIGURES 3 and 4. A sponge rubber pad 58, spacers 60, a cleat bar 62 and screws 64 are provided at the support and are respectively similar to pad 46, spacers 50, cleat bar 52, and screws 54, and serve the same functions as in the other housing 28. The spacers 60 and screws 64, are, of course, shorter than the spacers 50 and screws 54, respectively, since only a single grid 32 is being clamped and supported in the tubing housing 26. The support means described with respect to FIGURE 5 is duplicated at the other support location in the tubing housing 26.

The tubing housings 26 and 28 are normally completely assembled with full installation of tubings and capped electrodes. These tubing or grid assemblies are integrally shipped to various places, and can be easily installed when replacing a defective tubing assembly in a signal. With the means and method of mounting the tubings in the housings as described above, successful shipment of a complete tubing assembly is possible. The necessity of carefully packing the tubings separately is eliminated, and the difficulty of properly installing the tubings in their housings at remote locations and under inconvenient conditions is avoided. In various other attempts of premounting tubing in a housing and subsequent shipment thereof, the breakage and damage to tubing mounted in a housing has been so great as to render such shipment of housings having fully mounted tubing infeasible. In contrast, breakage and damage to tubing mounted in a housing according to this invention is virtually nil, and shipment of such tubing mounted housings is highly successful and practical.

It is to be understood that the particular embodiment of our invention described above and shown in the drawings is merely illustrative of and not restrictive on the broad invention, and that various changes in design, structure and arrangement may be made without departing from the spirit and scope of the appended claims.

We claim:

1. A tubular grid assembly, comprising: a reflector housing adapted to be easily installed in a mounting, said housing including a reflective back wall, enclosing reflective side walls, and an open face in front of said back wall; a first tubing bent to form a first grid having a plurality of parallel lines of tubing in a plane; a second tubing bent to form a second grid similar to said first gird; and support meanse for mounting said first grid in a plane substantially parallel to said back wall and at a predetermined distance before said back wall, and mounting said second grid with respective lines of tubing directly aligned before and contiguous to corresponding line of tubing of said first grid, within said housing whereby said housing generally focuses light from said first and second grids out said open face, said support means including a relatively thin block disposed crosswise to said parallel lines of tubing of said first and second grids, a resilient cushion positioned on a normally forward surface of said block for supporting said parallel lines of tubing of said first grid and of said second grid directly aligned before and contiguous to said first grid, a cleat bar, said cushion and cleat bar having respective cushioning and clamping surfaces substantially matching said forward surface of said block, means for clamping said cleat bar against said parallel lines of tubing of said second grid firmly in series with said parallel lines of tubing of said first grid against said cushion, and means for establishing clamping force maintained against said parallel lines of tubing of said first and second grids to a predetermined amount.

2. A tubular grid assembly, comprising: a reflector housing adapted to be easily installed in a mounting, said housing including a reflective back wall, enclosing reflective side walls, and an open face in front of said back wall; a first tubing bent to form a first grid having a plurality of parallel lines of tubing in a plane; a second tubing bent to form a second grid similar to said first grid; and support means for mounting said first grid in a plane substantially parallel to said back wall and at a predetermined distance before said back wall, and mounting said second grid directly aligned before and contiguous to said first grid within said housing whereby said housing generally focuses light from said first and second grids out said open face, said support means including a block disposed crosswise to said parallel lines of tubing of said first and second grids, a resilient cushion positioned on said block for supporting said parallel lines of tubing of said first grid and of said second grid directly aligned before and contiguous to said first grid, and means for clamping said parallel lines of tubing of said second grid firmly in series with said parallel lines of tubing of said first grid against said cushion whereby said parallel lines of tubing of said first and second grids are resiliently cushioned to withstand a range of varying shocks.

3. A tubular grid assembly, comprising: a reflector housing adapted to be easily installed in a mounting, said housing including a reflective back wall, enclosing reflective side walls, and an open face in front of said back wall; a first tubing bent to form a first grid having a plurality of parallel lines of tubing in a plane; a second tubing bent to form a second grid similar to said first grid; and support means for mounting said first grid in a plane substantially parallel to said back wall and at a predetermined distance before said back wall, and mounting said second grid with respective lines of tubing directly aligned before and contiguous to corresponding lines of tubing of said first grid, within said housing whereby said housing generally focuses light from said first and second grids out said open face, said support means including a block disposed crosswise to said parallel lines of tubing of said first and second grids, a resilient cushion positioned on said block for supporting said parallel lines of tubing of said first grid and of said second grid directly aligned before and contiguous to said first grid, a cleat bar, screw means connecting said cleat bar to said block for clamping said cleat bar against said parallel lines of tubing of said second grid firmly in series with said parallel lines of tubing of said first grid against said cushion, and means for establishing clamping force maintained against said parallel lines of tubing of said first and second grids to a predetermined amount including hollow spacer means positioned about said screw means for limiting travel of said cleat bar against said parallel lines of tubing of said first and second grids to a predetermined amount whereby said parallel lines of tubing of said first grid in series with said second grid are resiliently cushioned to withstand a range of varying shocks.

References Cited in the file of this patent
UNITED STATES PATENTS

| | | |
|---|---|---|
| 1,927,120 | Grotz et al. | Sept. 19, 1933 |
| 2,042,316 | Johnson | May 26, 1936 |
| 2,046,044 | Vissing | June 30, 1936 |
| 2,321,080 | Haber | June 8, 1943 |